United States Patent [19]
Burton

[11] Patent Number: 5,694,397
[45] Date of Patent: Dec. 2, 1997

[54] CONSTANT BIT RATE SYNCHRONIZATION

[75] Inventor: Nigel John Burton, Poole, United Kingdom

[73] Assignee: GPT Limited, United Kingdom

[21] Appl. No.: 532,486

[22] Filed: Sep. 22, 1995

[30] Foreign Application Priority Data

Sep. 29, 1994 [GB] United Kingdom ............ 9419611

[51] Int. Cl.$^6$ ........................................ H04L 7/00
[52] U.S. Cl. ............................... 370/516; 375/362
[58] Field of Search ................... 370/94.2, 100.1, 370/105.1, 47, 394, 503, 509, 516; 375/354, 356, 362

[56] References Cited

U.S. PATENT DOCUMENTS

| | | | |
|---|---|---|---|
| 4,890,303 | 12/1989 | Bacler | 375/356 |
| 4,894,823 | 1/1990 | Adelmann et al. | 370/94.2 |
| 5,204,882 | 4/1993 | Chao et al. | 370/110.1 |
| 5,260,978 | 11/1993 | Fleischer et al. | 375/354 |
| 5,526,362 | 6/1996 | Thompson et al. | 370/100.1 |

FOREIGN PATENT DOCUMENTS 05037560  2/1993  Japan .

*Primary Examiner*—Benedict V. Safourek
*Attorney, Agent, or Firm*—Kirschstein, et al.

[57] ABSTRACT

Packet based telecommunications networks are being developed to carry Constant Bit Rate (CBR) data streams between source and destination exchanges in the form of multiplexed packets, which are recombined at the destination exchange into a CBR stream. In such a network it is desirable to synchronise the frequency and maintain the phase relation of the recombined CBR stream with those of a source CBR stream arriving at the source exchange. The described synchronising circuit for use in such a network comprises a local oscillator (46), a local Residual Time Stamp (RTS) generator (50) arranged to determine a local RTS value (51) from the local oscillator frequency, a comparator (52) to determine the difference between the local RTS value (51) and a source RTS value (41) extracted from packets received at a destination exchange (10), and an oscillator controller (54) responsive to the difference to adjust the frequency and phase of the local oscillator to maintain the difference constant.

12 Claims, 3 Drawing Sheets

CONSTANT BIT RATE SYNCHRONIZATION

BACKGROUND TO INVENTION

Field of the invention

Packet based telecommunications networks are being developed to carry Constant Bit Rate (CBR) data streams between a source and destination exchange in the form of multiplexed packets, or cells, which are recombined at the destination exchange into a CBR data stream. It is necessary in such a network to synchronise the frequency, and maintain the phase relation, of the recombined CBR stream with those of a source CBR stream arriving at the source exchange. The present invention relates to apparatus for, and a method of, achieving this synchronisation.

FIG. 1 shows an Asynchronous Transfer Mode (ATM) transmission network for carrying CBR data streams in the form of ATM cells. A CBR data stream 2 arriving at a source exchange 4 is converted into ATM cells 6 which are transmitted across an ATM network 8 to a destination exchange 10. The ATM cells 6 are recombined at the destination exchange 10 into a CBR data stream 12. In carrying a CBR signal across a packet-based network the rate at which data leaves the destination exchange 10 should be the same as the rate at which it arrives at source exchange 4 requiring the frequency of the recombined CBR stream 12 and source CBR stream 2 to be synchronised.

One proposed method of frequency synchronisation is the use of residual time stamp (RTS) values which are calculated at the source exchange 4 using the frequency of the source CBR stream 2 and transmitted as part of the ATM cell 6 to the destination exchange 10 where the RTS values are used to calculate the frequency of the source CBR stream 2. FIG. 1 shows such a system. A CBR line terminator 14 extracts the frequency 14A and data 14B associated with the CBR stream 2. The data 14B is diverted to a cell payload generator 16 which buffers and divides the data stream into data cells of the required number of bits. The data cells are converted into ATM cells 6 by ATM cell generator 18 which combines the data cells with a respective header generated by cell header generator 20. The header contains the RTS value generated by RTS generator 22 using the frequency 14A of the CBR stream 2.

At the destination exchange 10 the received ATM cells 6 are buffered in a cell buffer 38. The ATM cell header is processed by cell header processor 40 which extracts the received RTS value 42 whilst the ATM cell data is routed from the cell buffer 38 to a cell payload processor 43 before being recombined into a CBR stream 12 by CBR generator 48. The received RTS values 42 are used by calculating means 44 to calculate the source CBR frequency. The frequency of a local oscillator 46 is set to this calculated frequency which maintains the frequency of the recombined CBR stream 12.

RTS values are generated by the Synchronous Residual Time Stamp (SRTS) method which is standardised in International Consultative Committee for Telegraphs and Telephones (CCITT), now known as International Telecommunications Union (ITU), recommendation I-365, B-ISDN ATM adaption layer (AAL) specification, temporary document 60 SGXVIII, 1993 and described in U.S. Pat. No. 5,260,978. FIG. 2 shows an RTS generator which uses the SRTS method. The method comprises continuously clocking a modulo sixteen counter 24 with a clock 26 which is related to a network reference frequency 28. Clock 25 is generated by dividing the network frequency reference 28 by an integer x using divider circuit 30. The value of x is defined in the CCITT recommendation and is a power of two which satisfies the condition $$\text{twice } CBR \text{ spot frequency} \geq \frac{\text{network frequency}}{x} \geq CBR \text{ spot frequency}$$

A counter reader 32 is arranged to sample the current value of the counter 24 every n cycles of source frequency, where n is defined by the CCITT recommendations. This sampling period is derived by dividing the frequency of the CBR stream 14A by n, using divider 34. Conveniently the counter reader 32 comprises a four bit gated latch. The value 36 read from the counter 24, which is in the range 0 to 15 (4 bits), forms one RTS value and is transmitted as part of the header of a number of ATM cells 6 to the destination exchange 10.

The frequency of the local oscillator 46 is set by calculating means 44 which calculates the source CBR frequency using the received RTS values and the network reference frequency 28. For a stable source CBR frequency the RTS value will change approximately linearly with time. The number of sampling periods required for the RTS value to change is related to the ratio of the network reference 28 and source CBR frequencies. Consequently the average rate of change of RTS value with time is related to the source frequency and can be used to calculate the source CBR frequency. Although, in theory, it is only necessary to count the number of received RTS values before the value changes in order to determine the rate of change of the RTS value, averaging over a large number of RTS values is actually required to achieve accurate frequency determination.

The calculated frequency is used to maintain the frequency of the local oscillator 46. In this way the frequency of the local oscillator 46 is synchronised to the frequency of source CBR stream 2. Such a system however does not maintain the initial phase relation between the source 2 and recombined 12 CBR streams as adjustments are made to the local oscillator 46 frequency. Mathematical modelling for such a system in which the network reference frequency is 155.52 MHz, the spot source CBR frequency is 2.048 MHz, n=3008 and x=64 indicates that a phase error accumulation of approximately 5 bits can be expected during frequency synchronisation which occurs within approximately 0.3 seconds.

SUMMARY OF THE INVENTION

According to the present invention there is provided a synchronising circuit for use in a multiplexed packet based telecommunications network capable of carrying Constant Bit Rate (CBR) data comprising; a local oscillator, a local Residual Time Stamp (RTS) generator arranged to determine a local RTS value from the local oscillator frequency, a comparator to determine the difference between the local RTS value and a source RTS value extracted from packets received at a destination exchange, and an oscillator controller responsive to the difference to adjust the frequency and phase of the local oscillator to maintain the difference constant.

Preferably the local RTS generator comprises a counter clocked by means of a clock derived from a network reference frequency, a÷n divider to divide the frequency of the local oscillator by n, the output being connected to actuate a counter reader to read the counter output every n cycles of local oscillator frequency.

Advantageously the frequency of the local oscillator is adjusted by an amount (defined in bits $s^{-1}$) equal to the square of the difference and the phase of the local oscillator is adjusted by an amount (defined in bits) such that the phase stabilises at approximately the same time as frequency synchronisation.

According to another aspect of the present invention there is provided a method of synchronising the frequency, and maintaining the phase, of a CBR data stream formed at a destination exchange to that of a source CBR data stream, the method comprising: extracting a source Residual Time Stamp (RTS) from a received packet, generating a local RTS value from a local oscillator frequency, comparing the source and local RTS values and adjusting the frequency and phase of the local oscillator to maintain the difference constant.

Preferably the source and local RTS values are generator using the Synchronous Residual Time Stamp (SRTS) method.

Advantageously the frequency of the local oscillator is adjusted by an amount (defined in bits$^{-1}$) equal to the square of the difference and the phase of the local oscillator is adjusted by an amount (defined in bits) such that the phase stabilises at approximately the same time as frequency synchronisation.

BRIEF DESCRIPTION OF DRAWINGS

The invention will now be described by way of example with reference to the accompanying drawings in which.

DETAILED DESCRIPTION OF PREFERRED EMBODIMENT

Figure 1:
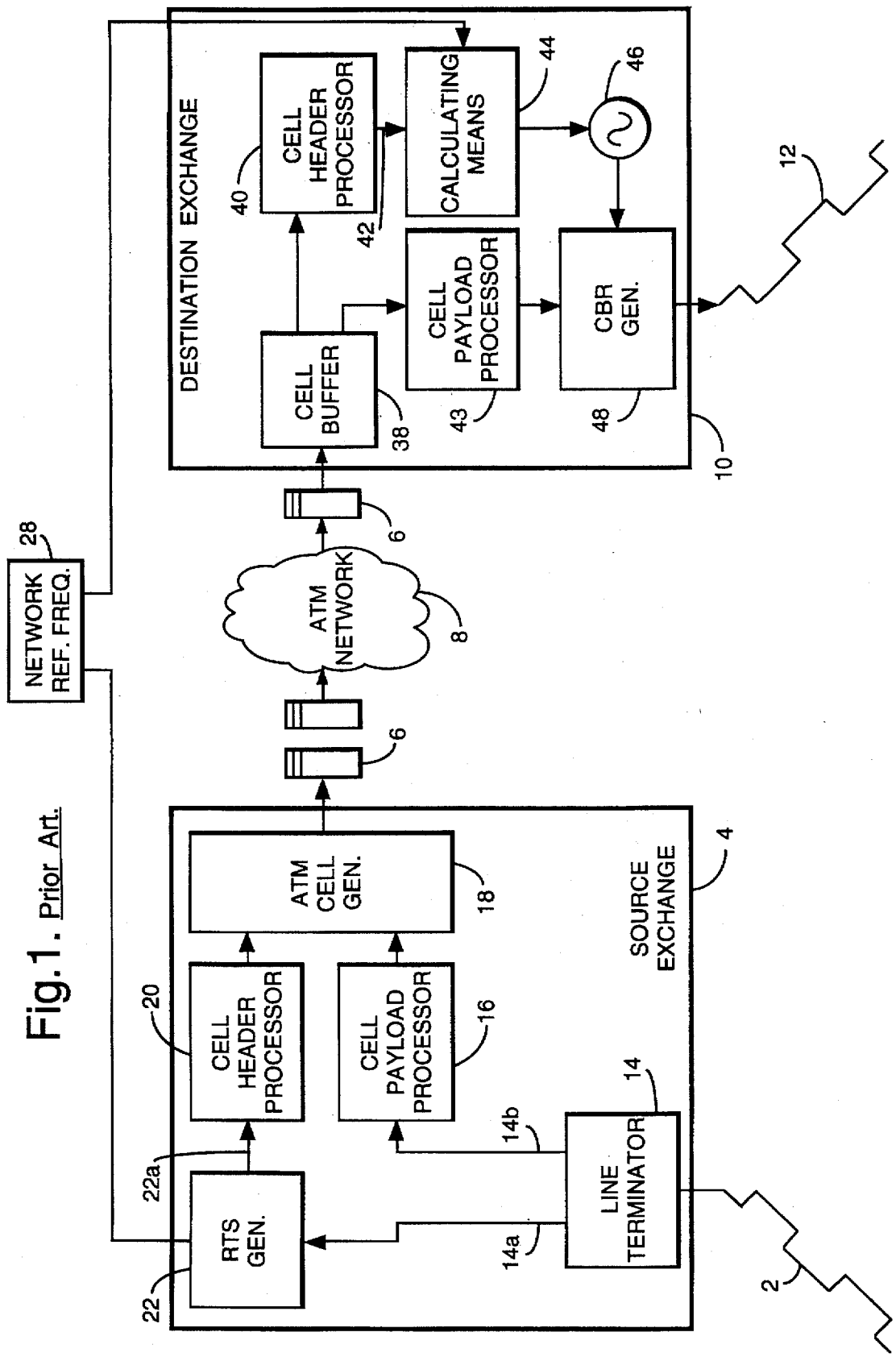
FIG. 1 is a prior art Asynchronous Transfer Mode (ATM) packet based telecommunications network.
Figure 2:
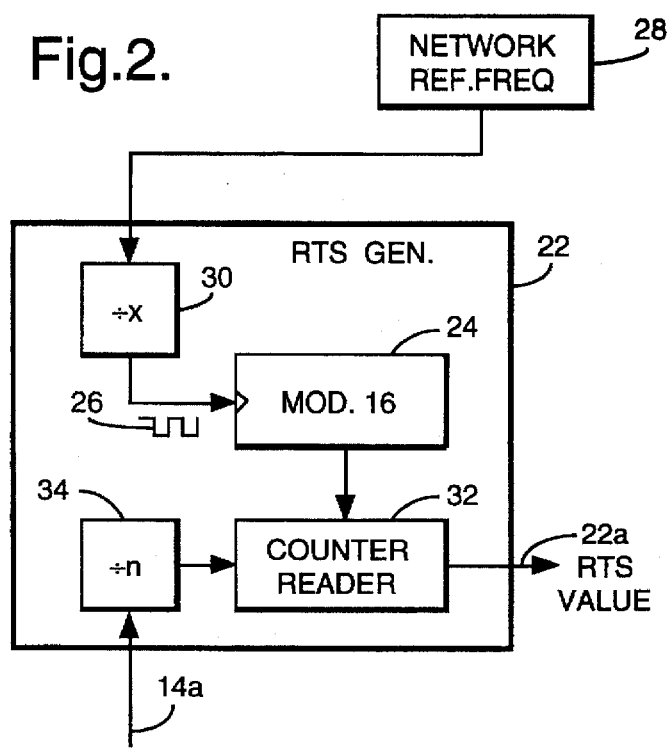
FIG. 2 is a Residual Time Stamp (RTS) generator circuit which uses the Synchronous Residual Time Stamp (SRTS) method.
Figure 3:
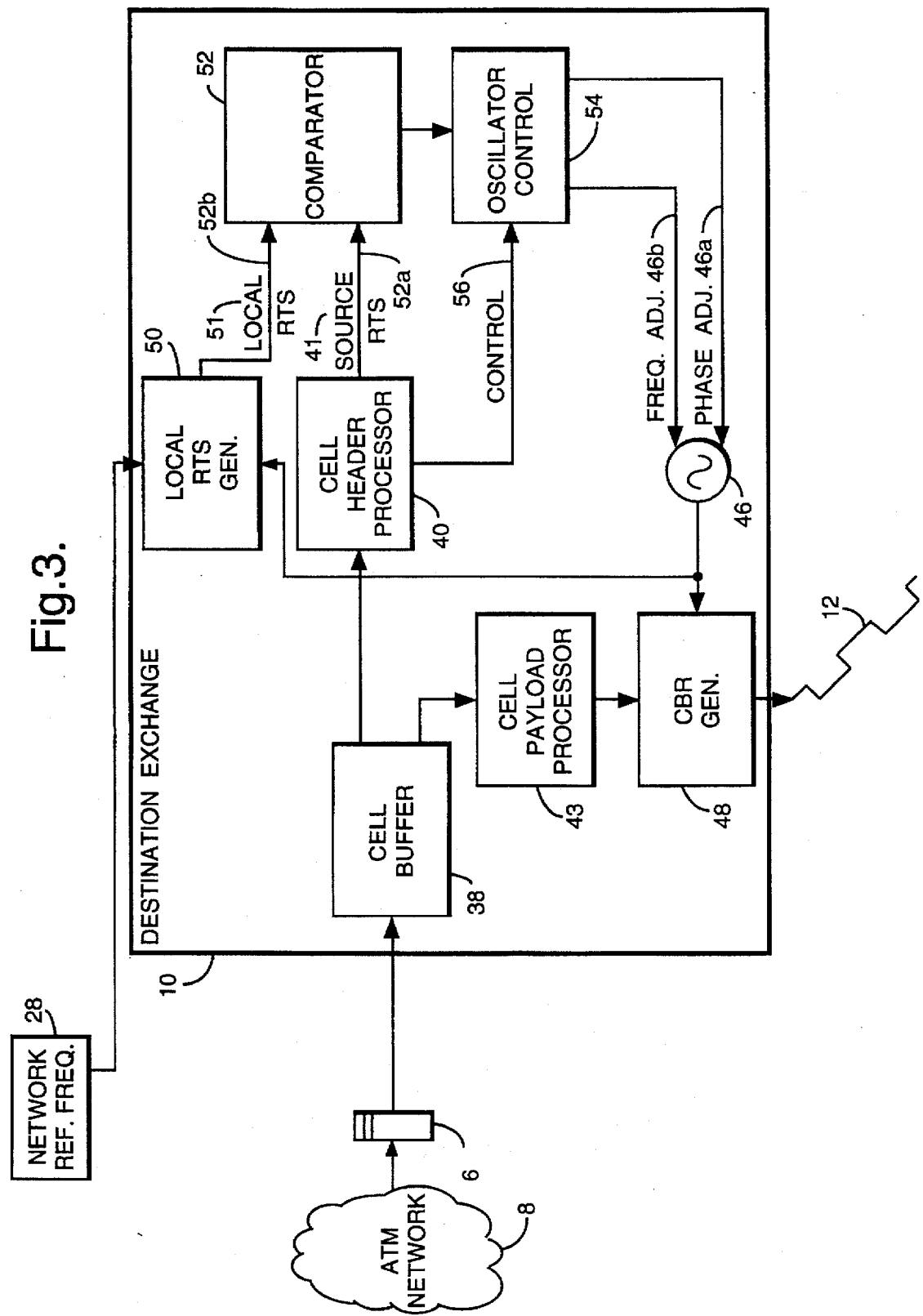

Referring to FIG. 3 there is shown a destination exchange 10 of an ATM packet based telecommunications network including a synchronising circuit for synchronising the frequency, and maintaining the phase relation of a local oscillator 46 to that of the source CBR stream 2. ATM cells 6 arriving at the destination exchange 10 are buffered in a cell buffer 38. Information contained in the header of the ATM cell 5 is processed by cell header processor 40 to extract the source RTS value 41. This RTS value 41 is applied to a first input 52a of a comparator 52. A local RTS generator 50 calculates a local RTS value 51 using the frequency of the local oscillator 46 and the network reference frequency 28. The local RTS generator 50 uses the same method to generate the local RTS value 51 as that applied at the source exchange 4 to generate the source RTS value, for example the SRTS method as shown in FIG. 2. The local RTS value 51 is compared with the source RTS value 41 by applying it to a second input 52b of the comparator 52. The output of the comparator 52 which represents the difference in RTS values is used by an oscillator controller 54 to adjust the frequency and phase of the local oscillator 46 to synchronise the frequency, and maintain the phase relation between the source CBR stream and local oscillator using a phased lock loop type method.

Figure 4:
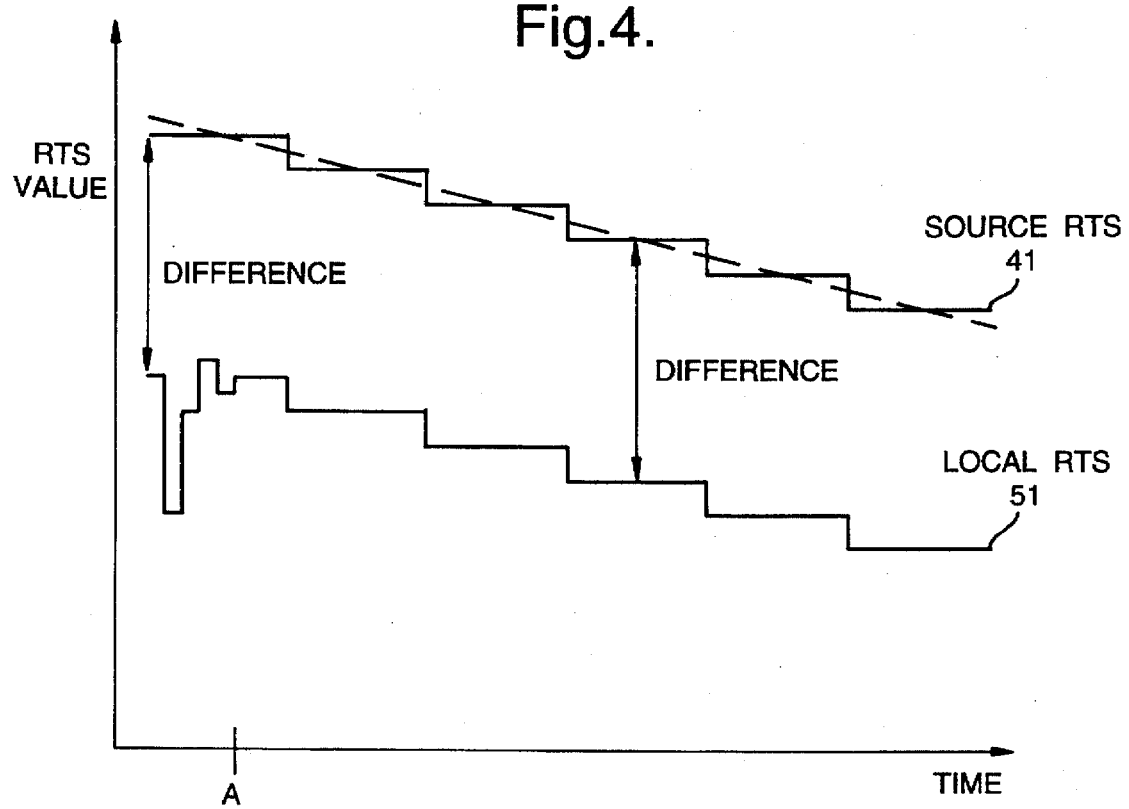
FIG. 3 is a destination exchange including the synchronising circuit of the present invention and FIG. 4 shows the variation of local and source RTS values with time.

When the local oscillator 46 is in the same phase and at the same frequency as the source CBR stream 2, the local 51 and source 41 RTS values will be the same and will change with time in the same way. However in the majority of cases a phase difference will exist and it is desirable in an ATM network to maintain this difference rather than to minimise it. The phase difference is related to the difference between the RTS values, as shown in FIG. 4. The phase relation between the source CBR stream 2 and the local oscillator 46 can therefore be maintained if this difference can be kept constant. This is achieved by oscillator controller 54 adjusting the phase 46a of the local oscillator 46 to maintain the difference between source 41 and local 51 RTS values.

The frequency of the source CBR stream 2 is related to the rate of change of source RTS with time, that is the gradient of the plot shown in FIG. 4. Similarly the local oscillator frequency is related to the respective gradient of local RTS value versus time. To synchronise the frequency of the source CBR stream 2 and local oscillator 46 therefore requires these gradients to be the same. However rather than trying to maintain the gradients which requires averaging over a large number of values to determine frequency values, the oscillator controller 54 is arranged to adjust the frequency 46b of the local oscillator 46 to maintain the difference between the source 41 and local 51 RTS values. By maintaining the difference in RTS values the local RTS value will track the source RTS value and frequency synchronisation is achieved. Within FIG. 4 frequency synchronisation is achieved at point A on the time axis.

Any algorithm can be applied by the oscillator controller 54 to determine how the local oscillator frequency and phase should be adjusted according to the difference in RTS values. For example consider a network carrying CBR data streams with a spot frequency of 2.048 Mbits$^{-1}$ and operating with a network reference frequency of 155.520 Mbits$^{-1}$. The value of x will be 64 (155.52÷2.048=75.94=$2^6$) and n=3008 (47×8×8=No of octets×No of bits×No of cells between determining RTS value). In such a network the oscillator controller 54 is arranged to adjust the phase of the local oscillator 46 by one fifteenth of a bit and adjust the frequency by an amount (defined in bits s$^{-1}$) equal to the square of the difference between the two RTS values. With this algorithm frequency synchronisation and phase stabilisation from the worst case situation (that is 50 ppm of the spot frequency—2.0479 Mhz) is achieved within 0.3 seconds with a residual phase error of less than 0.3 bits. The phase increment of one fifteenth of a bit is selected to ensure that the phase relation also stabilises at approximately the same time as frequency synchronisation, that is within 0.3 seconds.

It is preferred to apply the algorithm in an initial period to every received RTS value for rapid synchronisation and then only make adjustments periodically after a predetermined number of cells to reduce jitter accumulation. To reduce the effect that a corrupt source RTS value could have on the operation of the system the cell header processor checks the received RTS value to validate it. When a corrupt RTS value is detected a control signal 56 is passed to the oscillator controller 54. The oscillator controller 54 is configured upon receipt of such a signal 56 to either disable operation and maintain the current local oscillator frequency and phase, or to predict a value for the source RTS based on the history of previously received values and adjust the frequency and phase of the local oscillator based on this value. The cell header processor 40 can validate an RTS value since limits can be predicted as to how rapidly the RTS value will change with time. If a change in received RTS value is outside these limits the RTS value is assumed to have been corrupted. In the present example this ensures that (at least) one corrupt value can be detected and ignored, although this is at the expense of precision in the resolution of the source frequency.

An advantage of the present invention is that both the local and source RTS values are subject to the same effects of noise and therefore these effects tend to cancel out. This noise effect is caused when rounding or quantising the RTS value to the nearest integer.

What I claim is:

1. A synchronizing circuit for use in a multiplexed, packet-based telecommunications network capable of carrying Constant Bit Rate (CBR) data streams between a source exchange and a destination exchange, said circuit comprising:
   a) a destination exchange local oscillator for generating a local oscillator frequency and phase;
   b) a local Residual Time Stamp (RTS) generator for determining a local RTS value from the local oscillator frequency;
   c) processing means for extracting a source RTS value from packets received at the destination exchange;
   d) a comparator for determining a difference between the local RTS value and the source RTS value; and
   e) an oscillator controller responsive to said difference for adjusting the local oscillator frequency and phase to maintain said difference constant.

2. A synchronizing circuit for use in a multiplexed, packet-based telecommunications network capable of carrying Constant Bit Rate (CBR) data streams between a source exchange and a destination exchange, said circuit comprising:
   a) a destination exchange local oscillator for generating a local oscillator frequency and phase;
   b) a local Residual Time Stamp (RTS) generator for determining a local RTS value from the local oscillator frequency, said local RTS generator including a counter which is clocked by means of a clock derived from a network reference frequency, a ÷ n divider for dividing the local oscillator frequency by n, and a counter reader connected to the output of the counter and operable to read the counter output every n cycles of the local oscillator frequency;
   c) processing means for extracting a source RTS value from packets received at the destination exchange;
   d) a comparator for determining a difference between the local RTS value and the source RTS value; and
   e) an oscillator controller responsive to said difference for adjusting the local oscillator frequency and phase to maintain said difference constant.

3. The synchronizing circuit according to claim 2, wherein the oscillator controller is operable to adjust the local oscillator frequency by an amount related to the square of said difference.

4. The synchronizing circuit according to claim 3, wherein the oscillator controller is further operable to determine an initial difference between the local RTS value and the source RTS value, said initial difference corresponding to an initial phase difference between said destination exchange local oscillator phase and the source exchange local oscillator phase, the local oscillator controller being further operable to adjust the phase of said destination exchange local oscillator such that, when frequency synchronization is achieved, said difference between the local RTS and the source RTS values is substantially the same as said initial difference.

5. The synchronizing circuit according to claim 2, wherein the oscillator controller is further operable to determine an initial difference between the local RTS value and the source RTS value, said initial difference corresponding to an initial phase difference between said destination exchange local oscillator phase and the source exchange local oscillator phase, the local oscillator controller being further operable to adjust the phase of said destination exchange local oscillator such that, when frequency synchronization is achieved, said difference between the local RTS and the source RTS values is substantially the same as said initial difference.

6. A synchronizing circuit for use in a multiplexed, packet-based telecommunications network capable of carrying Constant Bit Rate (CBR) data streams between a source exchange and a destination exchange, said circuit comprising:
   a) a destination exchange local oscillator for generating a local oscillator frequency and phase;
   b) a local residual time stamp (RTS) generator for determining a local RTS value from the local oscillator frequency;
   c) processing means for extracting a source RTS value from packets received at the destination exchange;
   d) a comparator for determining a difference between the local RTS value and the source RTS value; and
   e) an oscillator controller responsive to said difference for adjusting the local oscillator frequency and phase to maintain said difference constant, said oscillator controller being operable to adjust the local oscillator frequency by an amount related to the square of said difference.

7. The synchronizing circuit according to claim 6, wherein the oscillator controller is further operable to determine an initial difference between the local RTS value and the source RTS value, said initial difference corresponding to an initial phase difference between said destination exchange local oscillator phase and the source exchange local oscillator phase, the local oscillator controller being further operable to adjust the phase of said destination exchange local oscillator such that, when frequency synchronization is achieved, said difference between the local RTS and the source RTS values is substantially the same as said initial difference.

8. A synchronizing circuit for use in a multiplexed, packet-based telecommunications network capable of carrying Constant Bit Rate (CBR) data streams between a source exchange and a destination exchange, said circuit comprising:
   a) a destination exchange local oscillator for generating a local oscillator frequency and phase;
   b) a local residual time stamp (RTS) generator for determining a local RTS value from the local oscillator frequency;
   c) processing means for extracting a source RTS value from packets received at the destination exchange;
   d) a comparator for determining a difference between the local RTS value and the source RTS value; and
   e) an oscillator controller responsive to said difference for adjusting the local oscillator frequency and phase to maintain said difference constant, said oscillator controller being operable to determine an initial difference between the local RTS value and the source RTS value, said initial difference corresponding to an initial phase difference between said destination exchange local oscillator phase and the source exchange local oscillator phase, the local oscillator controller being further operable to adjust the phase of said destination exchange local oscillator such that, when frequency synchronization is achieved, said difference between the local RTS and the source RTS values is substantially the same as said initial difference.

9. A method of synchronizing the frequency of, and maintaining the phase between, a Constant Bit Rate (CBR) data stream received at a destination exchange to that of a CBR data stream transmitted from a source exchange, the method comprising the steps of:

a) at the destination exchange, generating a local oscillator frequency and phase;

b) generating a local residual time stamp (RTS) value from the local oscillator frequency;

c) extracting a source RTS value from packets received at the destination exchange;

d) determining a difference between the local RTS value and the source RTS value; and e) adjusting the local oscillator frequency and phase to maintain said difference constant.

10. A method of synchronizing the frequency of, and maintaining the phase between, a Constant Bit Rate (CBR) data stream received at a destination exchange to that of a CBR data stream transmitted form a source exchange, the method comprising the steps of:

a) at the destination exchange, generating a local oscillator frequency and phase;

b) generating a local residual time stamp (RTS) value from the local oscillator frequency;

c) extracting a source RTS value from packets received at the destination exchange;

d) determining a difference between the local RTS value and the source RTS value; and e) adjusting the local oscillator frequency by an amount related to the square of said difference to maintain said difference constant.

11. The method according to claim 10, and further comprising the steps of:

f) determining an initial difference between the local RTS value and the source RTS value, said initial difference corresponding to an initial phase difference between said destination exchange local oscillator phase and the source exchange local oscillator phase; and g) adjusting the local oscillator phase such that, when frequency synchronization is achieved, said difference is substantially the same as said initial difference.

12. A method of synchronizing the frequency of, and maintaining the phase between, a Constant Bit Rate (CBR) data stream received at a destination exchange to that of a CBR data stream transmitted from a source exchange, the method comprising the steps of;

a) at the destination exchange, generating a local oscillator frequency and phase;

b) generating a local residual time stamp (RTS) value from the local oscillator frequency;

c) extracting a source RTS value from packets received at the destination exchange;

d) determining a difference between the local RTS value and the source RTS value;

e) determining an initial difference between the local RTS value and the source RTS value, said initial difference corresponding to an initial phase difference between said destination exchange local phase and the source exchange local oscillator phase;

f) adjusting the local oscillator frequency to maintain said difference constant; and g) adjusting the local oscillator phase such that, when frequency synchronization is achieved, said difference between the local RTS and the source RTS values is substantially the same as said initial difference.

* * * * *